US006995764B1

(12) United States Patent
Demeure

(10) Patent No.: US 6,995,764 B1
(45) Date of Patent: Feb. 7, 2006

(54) AUTOMATIC APPLICATION TASK PLACEMENT PROCEDURE IN A SIGNAL PROCESSING MACHINE

(75) Inventor: Alain Demeure, Nice (FR)

(73) Assignee: Thales Underwater Systems S.A.S., Sophia Antipolis (FR)

( * ) Notice: Subject to any disclaimer, the term of this patent is extended or adjusted under 35 U.S.C. 154(b) by 666 days.

(21) Appl. No.: 10/110,108

(22) PCT Filed: Sep. 29, 2000

(86) PCT No.: PCT/FR00/02712

§ 371 (c)(1),
(2), (4) Date: Apr. 8, 2002

(87) PCT Pub. No.: WO01/27756

PCT Pub. Date: Apr. 19, 2001

(30) Foreign Application Priority Data

Oct. 8, 1999 (FR) .................................. 99 12574

(51) Int. Cl.
*G06T 15/00* (2006.01)
(52) U.S. Cl. ...................................... 345/427; 345/419
(58) Field of Classification Search ................ 345/418, 345/419, 427, 619; 703/2
See application file for complete search history.

(56) References Cited

U.S. PATENT DOCUMENTS 6,879,946 B2 * 4/2005 Rong et al. ...................... 703/2
6,891,535 B2 * 5/2005 Perry et al. .................. 345/420
6,900,806 B2 * 5/2005 Oka ........................... 345/427

FOREIGN PATENT DOCUMENTS

EP   0 819 279   1/1998
FR   2 748 138   10/1997

OTHER PUBLICATIONS

P. Boulet et al.: "Une approche a la SQL du traitement de donnees intensif dans GASPARD" RENPAR'11, pp. 1-6, Jun. 8, 1999-Jun. 11, 1999, Rennes, France.
C. Guettier: "Optimisation globale du placement d' applications de traitement du signal sur architectures paralleles utillsant la programmation logique avec contraintes" These Ecoles Des Mines De Paris, pp. 41-68 Dec. 12, 1997.
C. Ancourt et al.: "Automatic data mapping of signal processing applications" ASAP 97 Jul. 14, 97, Zurich, Switzerland

* cited by examiner

*Primary Examiner*—Phu K. Nguyen
(74) *Attorney, Agent, or Firm*—Oblon, Spivak, McClelland, Maier Neustadt, P.C.

(57) ABSTRACT

The invention relates to the methods for automatic placing of the tasks of an application in a signal-processing machine.

It consists in determining a Table Distribution Operator (201), called TDO, by forming it with a chain of Elementary Operators (301), called EOs, which are separated by linking spaces (302). These elementary operators are 8 in number, 4 of which are direct and 4 of which are mirrors of the direct ones.

It makes it possible to automate the hierarchization in the processing chain of a signal-processing machine operating with the method known by the name of "ARRAY-OL".

2 Claims, 7 Drawing Sheets

AUTOMATIC APPLICATION TASK PLACEMENT PROCEDURE IN A SIGNAL PROCESSING MACHINE

The present invention relates to the methods for automatic placing of the tasks of an application in a signal-processing machine, more particularly in a machine operating on the basis of a method of graphics input known by the name of "ARRAY-OL". This method is more particularly described in the following two patent applications, filed in the name of the Applicant.

In the first of these patent applications, filed on 7 Apr. 1995 under No. FR 95 04 175 and granted on 6 Apr. 1997 under No. FR 2 732 787, the Applicant described and claimed a method of graphics input in two dimensions intended to be used in order to input numerical data structured in table form.

In the second of these patent applications, filed on 26 Apr. 1996 under No. FR 96 05325 and granted on 14 Apr. 1998 under No. FR 2 748 138, the Applicant described and claimed a coding method supplementing the preceding method and based on a table structure in "calculation beans" mode, in order to arrive at a literal form called "Q/D" form.

Furthermore, in a patent application No. FR 99 02 906 filed on 9 Mar. 1999, the Applicant described and claimed a variant of the first of these two patents, enhanced by a hierarchy system making it possible to break down the details of an application into successive levels.

Figure 1:
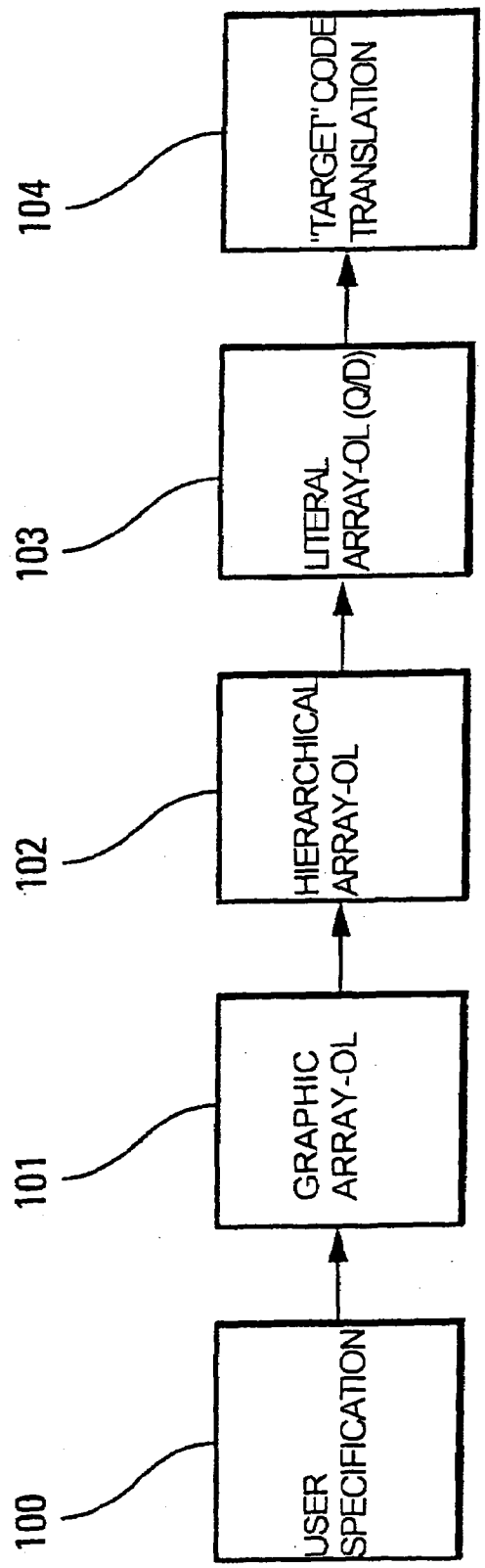

FIG. 1 represents the placing method according to the prior art, making it possible to pass from the user specification to the code executable by the target machine called "target code". In this method, the user first of all employs the method called "graphic ARRAY-OL", at the first stage 101 corresponding to the invention described and claimed in the patent FR 95 04175 cited above. The principle of the graphic-input method described in this patent implements an operand application table 30, a result application table 31, as well as an elementary application 32 with its input patterns 33 and its output patterns 34. The elementary application implements an elementary transform symbolized by F, for example an FFT, operating on a series of time-domain samples in order to derive a series of frequency spectral lines. This representation assumes that at least the result pattern is structured into a table and that, in order to execute the transform fully, the elementary transform is iterated as many times as necessary for the result table to be completely filled with sets of points identical to the set of points corresponding to the output pattern. This all takes place as if, at each iteration of the elementary transform, a "paving stone" were added, contributing to the construction of the result table. A paving stone is equivalent to the set of points corresponding to a pattern placed (in the sense of "mapped") onto a table. The position where the result paving stone is placed defines the position of the corresponding operand paving stone. It then implements the method called "hierarchical ARRAY-OL", at the second stage 102 corresponding to the patent application FR 99 02906 cited above. Then the information supplied by 102 is translated automatically by the method called "literal ARRAY-OL" or "Q/D" at the third stage 103 corresponding to the patent FR 2748138 cited above. He then passes to the last stage 104 consisting in converting the information supplied by 103 into the target code. The drawback of the method lies in the fact that the stage 102 requires human intervention.

The method according to the invention makes it possible to avoid this intervention and thus to automate the method as from the exit from 101.

In order to achieve this automation, the invention proposes a method for automatic placing of the tasks of an application in a signal-processing machine comprising a first stage implementing the known method called "graphic ARRAY-OL", followed by a second stage implementing the known method called "ARRAY-OL Q/D", characterized principally in that it is followed by a third stage implementing a method using Table Distribution Operators, called TDOs, formed by a chain of Elementary Operators, called EOs, separated by linking spaces, in order to describe the connections between the elements of a Sender space $N^e$, and the elements of a Receiver space $N^r$.

According to another characteriztic, it uses 8 Elementary Operators EO, 4 of which are direct and 4 of which are the mirrors of the direct ones and which correspond to the following actions:

a "Template" Elementary Operator, which serves to define the table sizes and the actions of which are "Cut" and "Extend";

a "Modulo" Elementary Operator, which makes it possible to bring down the accesses within the tables and the action of which is "Make converge";

a "Shift" Elementary Operator, which makes it possible to take into account "pavings" not starting from the origin of the table and the action of which is "Extend";

a "Projection" Elementary Operator, which makes it possible to establish connections between an input space Nf and an output space Nt, and the actions of which are "Extend" and "Make converge";

a "Template$^{-1}$" mirror Elementary Operator which makes it possible to extend or to cut, with identical parameter settings, the same connections as the "Template" Elementary Operator;

an "Exploding" Elementary Operator, corresponding to the "Modulo$^{-1}$" mirror operator, which operates in the opposite way to the "Modulo" EO and the actions of which are "Cut" and "Multiply";

a "Shift$^{-1}$" Elementary Operator, which is the mirror of a direct Shift with opposite sign parameters; and a "Segmentation" Elementary Operator, which is the mirror of the Projection operator and which makes it possible to segment a set of successive elements over the same dimension, and the actions of which are "Multiply" and "Cut".

Figure 2:
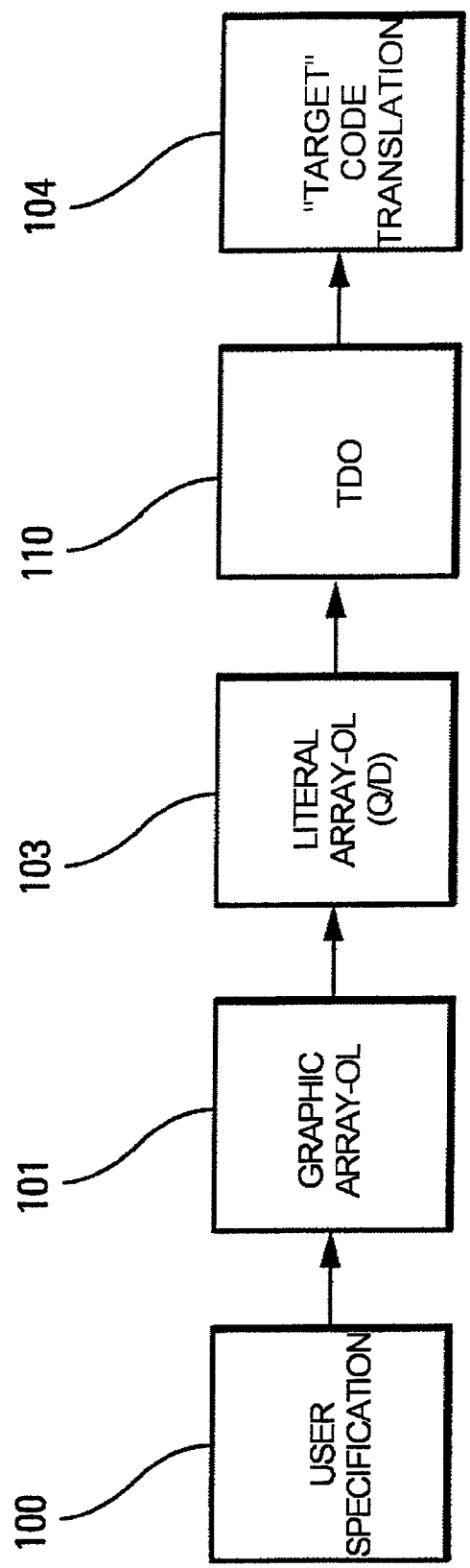
Figure 3:
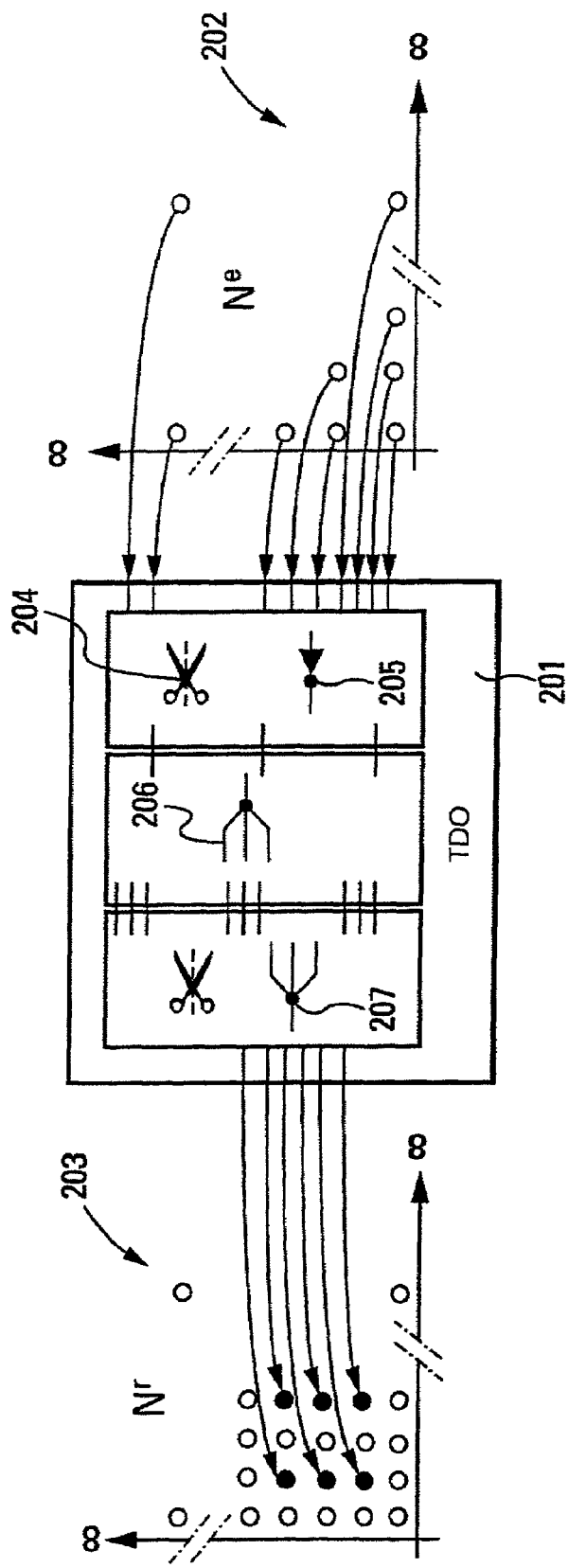
Figure 4:
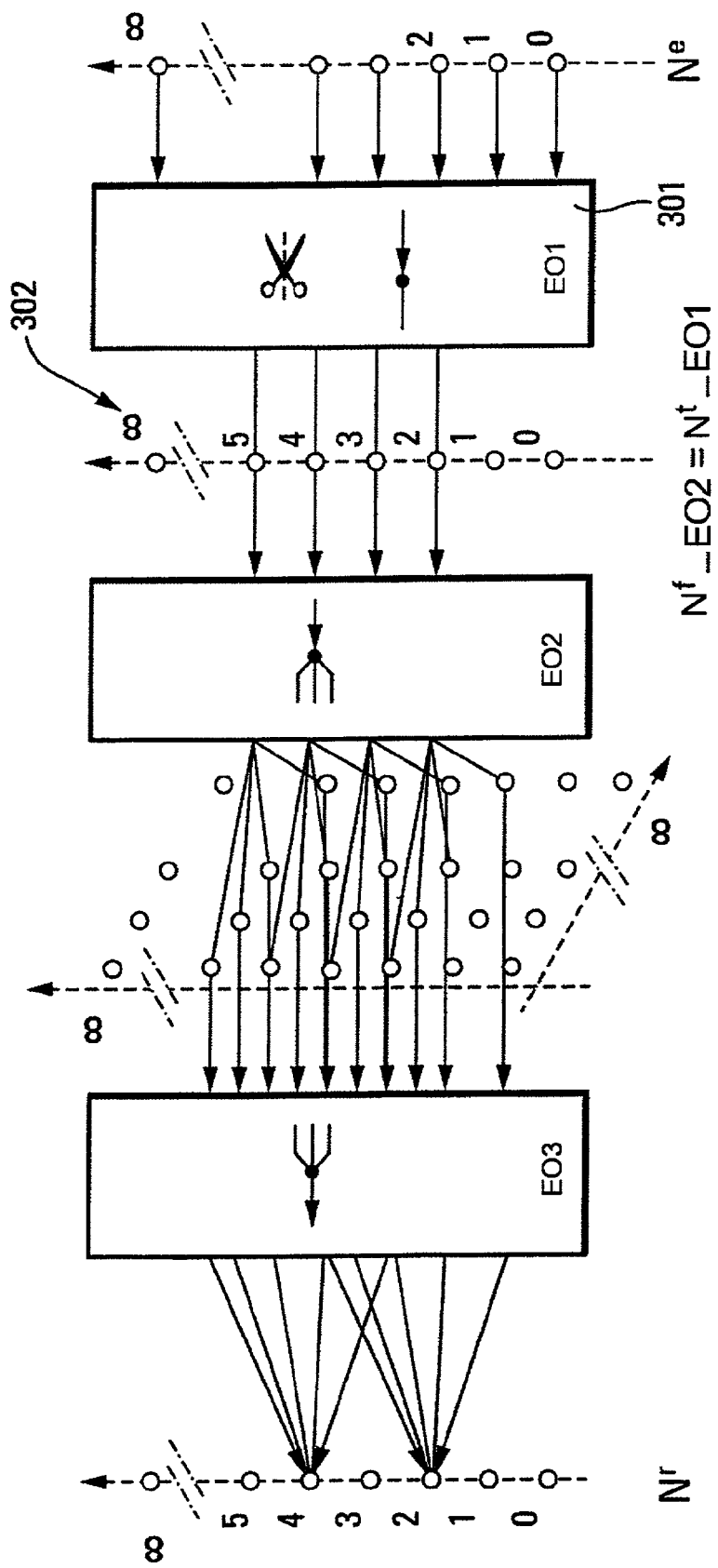
Figure 5:
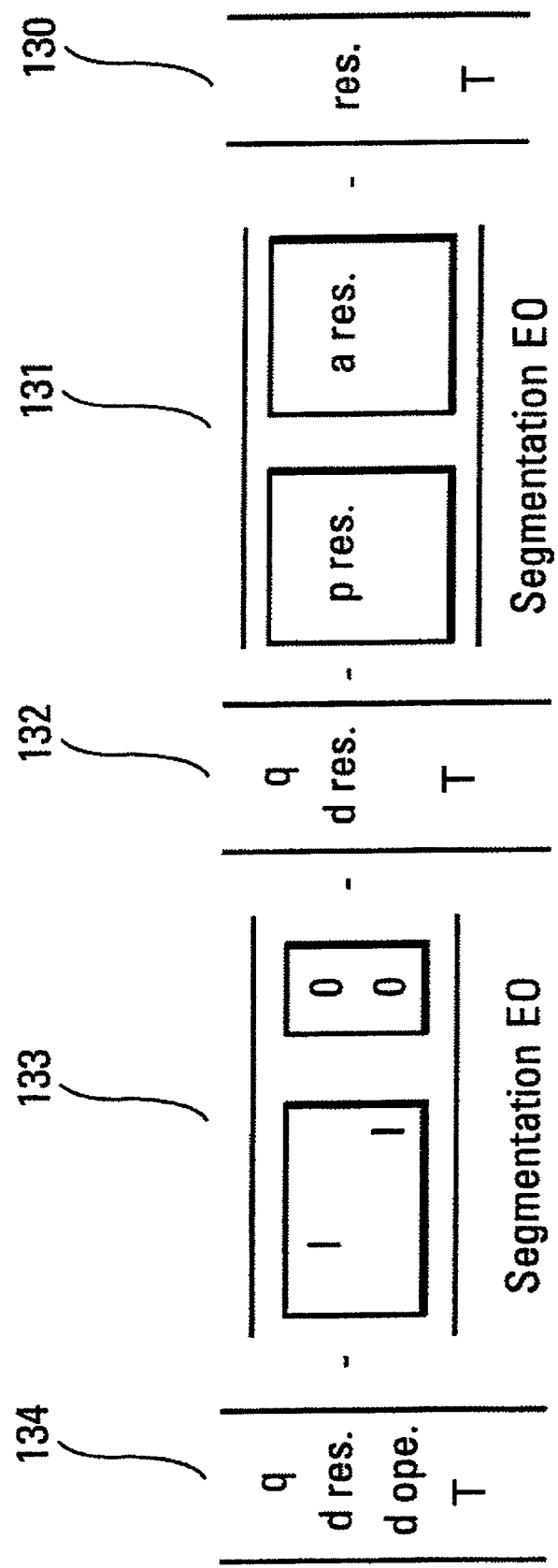
Figure 6:
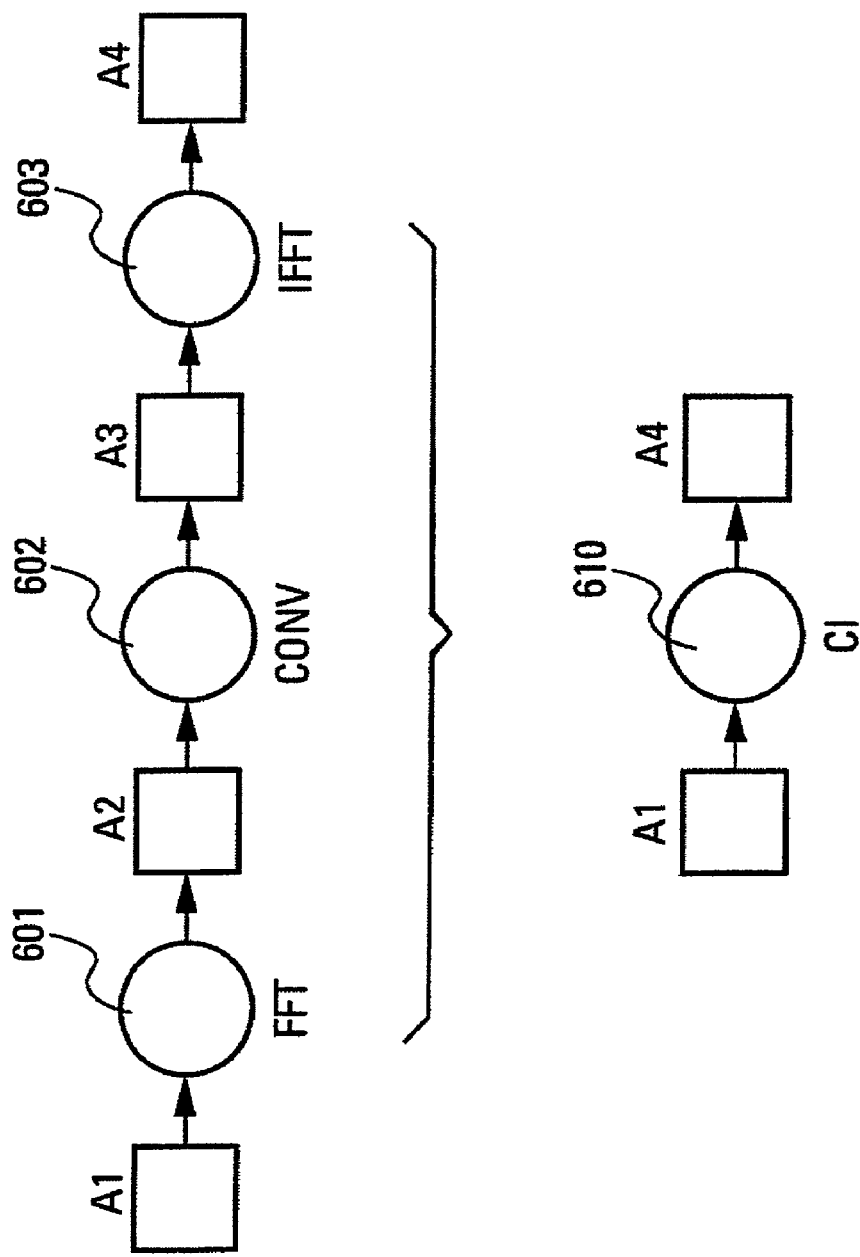
Figure 7:
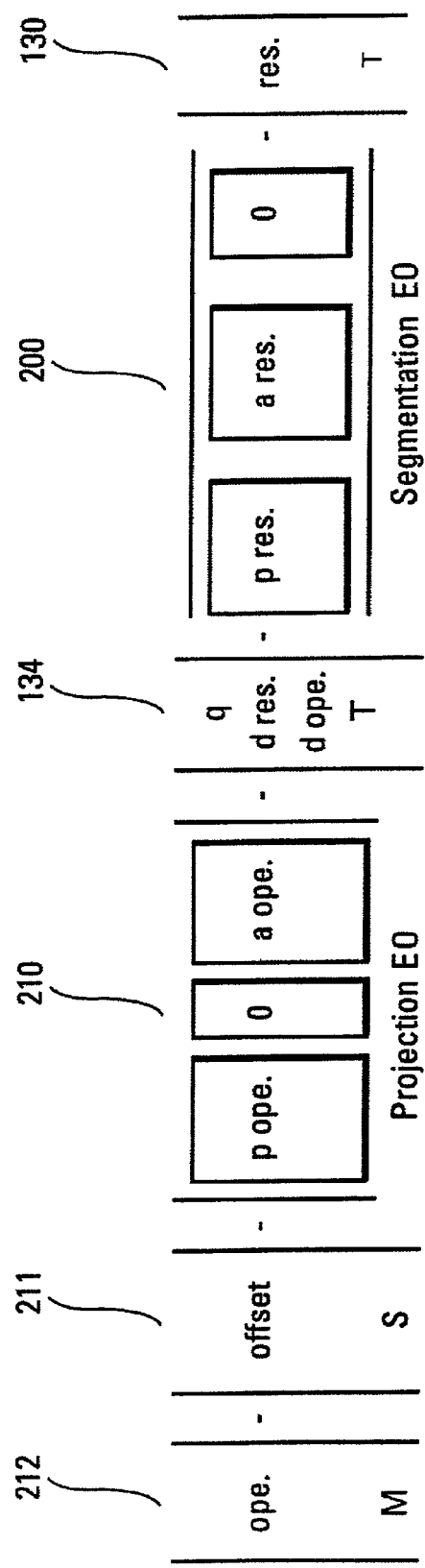

Other features and advantages of the invention will become clearly apparent in the following description, presented by way of nonlimiting example with regard to the attached figures, which represent:

FIG. 1, a flow chart of the chain of the method according to the prior art;

FIG. 2, a flow chart of the chain of the method according to the invention;

FIG. 3, an illustration of the definition of the table-distribution operators, called TDOs;

FIG. 4, a graphical illustration of the use of these TDOs;

FIG. 5, an example of writing, in TDOs, of connections between a result space and a complete Q/D space;

FIG. 6, an example of representation of successive tasks in the form of a "macro-task";

FIG. 7, an example of writing, in TDOs, of an ARRAY-OL task.

FIG. 2 represents the series of stages of the method according to the invention. The user implements the method "101" as before. Then, without passing through the stage 102, the information is translated directly by the method "103". According to the invention, the information is then processed by the method called "TDO" at 110, TDO being the abbreviation for Table Distribution Operators. Next, the information obtained is, as before, converted in 104.

It will therefore be understood that the "TDOs" constitute a tool making it possible, when they are used in the context of the general "ARRAY-OL" method, to hierarchize automatically in the same way as was implemented "manually" in the prior art at 102.

With the "TDOs", the relationships, or connections, between the elements of a sender space $N^e$ and the elements of a receiver space $N^r$ are described in a very abbreviated mathematical form. For a given task, the table containing the operand elements is a subset of $N^e$, in the same way that the table containing the result elements is a subset of $N^r$. The mathematical form employs the conventional functions of multidimensional, linear, integer algebra, as well as novel functions representing the "mirror" of conventional operations and which are particularly original in the invention. Thus manipulable mathematical expressions are obtained, which take account of the hierarchizations, of the calculation volumes and of the volumes of data stored or exchanged entailed by these hierarchizations.

Hence, with the invention, the criteria making it possible to guide the quality of a placing on a machine of a signal-processing application, called SP application, become calculable.

The "Table Distribution Operators", or TDOs, are formed from "Elementary Operators", or EOs.

The TDOs will be described on the basis of the definitions represented in FIGS. 3 and 4.

They make it possible to describe connections between elements of tables and, more precisely, between the elements of a Sender space $N^e$ 202 and a Receiver space $N^r$ 203 of dimension r.

In particular, a TDO 201 describes which are the elements of $N^e$ connected to elements of $N^r$ and, in this case, which ones.

A TDO consists of a sequence of Elementary Operators EOs such as 301, separated implicitly by spaces $N^d$ such as 302.

By convention, in the expressions, or the drawings, the Sender space $N^e$ is to the right, the connections propagate from right to left, and the Receiver space $N^r$ is on the left.

The dimensions of the two spaces seen by an EO, that is to say $N^f$ at the input ("From") and $N^t$ at the output ("TO"), form part of its parameter settings. Two consecutive EOs must have identical dimensions of spaces ("To" for one, "From" for the next).

An EO accomplishes a single action on a link between elements.

An EO may either cut, according to the symbol 204, or extend, according to the symbol 205, or multiply, according to the symbol 206, or else make converge, according to the symbol 207, the connections received from the space to its right, but only those of the elements already reached by one or more connections issued by the EO preceding it.

The elements of the Sender space ($N^e \equiv N^f$ of the rightmost EO) are, at the outset, all provided with one connection.

In order to be able to say not only to which elements of $N^r$ an element of $N^f$ is connected, but also to which elements of $N^f$ an element of $N^t$ is connected, a "mirror" EO is associated with each EO, altering the connections in the same way as the direct EO but switching over inputs and outputs.

In order to describe dependencies, distribution or placing, 8 EOs, i.e. 4 direct EOs and 4 mirror EOs prove to be sufficient. Between direct and mirror, it is chosen to regard as direct the EO carrying out the most familiar operation, which leads to the following table:

| DIRECT | MIRROR |
|---|---|
| Template | Template$^{-1}$ |
| Modulo | Modulo$^{-1}$ or Exploding |
| Shift | Shift$^{-1}$ |
| Projection | Segmentation |

The Template EO serves essentially to define table sizes. This EO has an $N^f$ and an $N^t$ of the same dimensions.

The Template is represented by a vector of pairs of integers (1, u); it is identified by the symbol G. In fact: $l_i \geq 0$, $u_i > l_i$. Often the $l_i$ are zero, and may then not feature.

A connection is established between an f element and a t element, both with the same indices, if for any i: $l_i \leq f_i < u_i$.

The actions of the Template EO are "Cut" (symbol 204), (Extend) (symbol 205).

By way of example, for a dimension f=t=3, then:

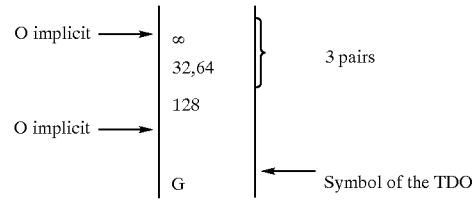

The Modulo EO serves essentially always to bring down the accesses within the tables, so as to set them "to size". This EO has an $N^f$ and an $N^t$ of the same dimensions.

The Modulo is represented by an integer vector (m); it is identified by the symbol M. In fact: $m_i \geq 1$.

A connection is established between an f element and a t element with, for any i: $t_i = (f_i) \bmod m_i$.

The action of the Modulo EO is "Make converge" (symbol 207).

By way of example, for one dimension for f=t=3, then:

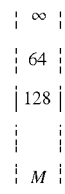

The Shift EO serves essentially to take account of the "pavings", as defined in the patent FR 95 04175 cited above, not starting on the origin of the table. This EO has an $N^f$ and an $N^t$ of the same dimensions.

The Shift is represented by an integer(s) vector; it is identified by the symbol S. These $s_i$ may be negative.

A connection is established between an f element and a t element with, for any i: $t_i = f_i + s_i$.

The action of the Shift EO is "Extend" (symbol 205);

By way of example, for f=t=3, then:

$$\begin{vmatrix} 0 \\ 16 \\ 0 \\ \vdots \\ S \end{vmatrix}$$

The Projection EO corresponds to the simplest form of distribution of a space $N_f$ toward a space $N_t$, such as the Q/D distribution on the result table, for example, as defined in the patent FR 96 05325 cited above.

This EO is defined by a matrix of coefficients $W_{i,c}$, usually integers. The projection establishes connections between a space $N_f$, the dimension of which is the number of columns, and a space $N_t$, the dimension of which is the number of rows. An f element is connected to a t element such that:

$$t = |W_{i,c}| . f$$

The actions of the Projection EO are "Extend", "Make converge".

By way of example, for f=4 and t=3, then:

$$\begin{vmatrix} 96 & 32 & 0 & 0 \\ 0 & 0 & 4 & 0 \\ 0 & 0 & 0 & 1 \end{vmatrix}$$

For the Template$^{-1}$ mirror EO, with identical parameter settings, Template and Template$^{-1}$ extend or cut the same connections:

$$\begin{vmatrix} I, u \\ G^{-1} \end{vmatrix} \equiv \begin{vmatrix} I, u \\ G \end{vmatrix}$$

By way of example, then:

$$\begin{vmatrix} \infty \\ 32, 64 \\ 128 \\ G^{-1} \end{vmatrix} \equiv \begin{vmatrix} \infty \\ 32, 64 \\ 128 \\ G \end{vmatrix}$$

The Modulo$^{-1}$ mirror EO, or Exploding, is, like the Modulo, represented by an integer (m) vector identified by an $M^{-1}$.

A connection is maintained between an f element and a t element if, for any i: $f_i<m_i$ with $f_i=(t_i)$ mod.$m_i$, or cut if $f_i \geq m_i$.

The actions of the Modulo$^{-1}$ EO are "Cut", "Multiply" (symbol 206).

By way of example, for a dimension f=t=3, then:

$$\begin{vmatrix} \infty \\ 64 \end{vmatrix}$$

-continued $$\begin{vmatrix} 128 \\ \vdots \\ M^{-1} \end{vmatrix}$$

The Shift$^{-1}$ mirror EO is equivalent to a direct Shift with parameters of opposite sign.

By way of example, for f=t=3, then:

$$\begin{vmatrix} -4 \\ -16 \\ 0 \\ S^{-1} \end{vmatrix} \equiv \begin{vmatrix} 4 \\ 16 \\ 0 \\ S \end{vmatrix}$$

The Segmentation mirror EO has been named thus since this EO makes it possible to segment a set of successive elements over the same dimension into "segments".

A Segmentation is characterized by a 2 D table containing the same integers $W_{i,c}$, following the same arrangement in rows and columns as the Projection matrix, of which this EO is the mirror. The representation used is as follows:

$$t = \overline{W_{i,c}} \cdot f$$

$N^f$ ($N^t$ resp.) has a dimension equal to the number of rows (to the number of columns resp.) of this 2 D table. An f element is connected to a t element if:

$$f = |W_{i,c}| . t$$

The actions of the Segmentation EO are "Multiply", "Cut".

It will be noted that a column of 0 is equivalent to the creation of a dimension.

By way of example, for f=3 and t=5, then:

| 96 | 32 | 0 | 0 | 0 |
|---|---|---|---|---|
| 0 | 0 | 4 | 0 | 0 |
| 0 | 0 | 0 | 1 | 0 |

It will be recalled here that the Q/D literal form is described in the patent FR 96 05325 cited above, in which it is observed that Q and D represent dimensions.

A dimension Q has, as its size, a dimension of the result table (if there are several of them, the "Master" is preferred) divided by the size of the dimension of the pattern, aligned parallel to the dimension of the Master. It represents a quotient, with the restriction that if Q=1 the dimension is cancelled. A dimension D is a dimension of the result pattern applied to the "Master"; it represents a divisor and is extended to the operand pattern.

A Q/D table brings together the Q dimensions and the D dimensions of the result patterns and of the operand patterns. A point on this table is identified by a q,d indices vector. When it is multiplied by matrices, the vector q,d makes it possible to find the elements read or written into the tables in question by the task in progress. These matrices contain the coefficients corresponding to the alignment interval (a) and paving interval (p) as defined in the patent FR 96 05325.

They contain columns of "0" making it possible to ignore the indices corresponding to the patterns placed on other tables.

Thus, in the Q/D model, the specification of a task is summarized by the parameters giving the dimensions and the sizes of the Q.D table, the content of the matrices, the dimensions and the sizes of the operand tables, and the offset vector which is added to the vector obtained after multiplication of q,d by the operand projection matrix.

Under these conditions, FIG. 5 represents the writing, in TDOs, of the connections between the results space and the complete Q/D space (that is to say relating to the result and operand tables).

A "Template" EO 130 defines a result table which is applied to a "Segmentation" EO 131 for which the integers $W_{i,c}$ are distributed into 2 submatrices. A first submatrix comprises a res. which represents the values of the alignment intervals on the result table and p res. which represents the values of the paving intervals. These values satisfy relations respectively with d res. and q.

After the "Template" EO (132), a table is obtained which is limited to the result pattern. This table is applied to a second "Segmentation" EO (133) where the "0" columns make it possible to create the operand dimensions d the sizes of which are defined in the template to the left.

After the "Template" EO 134, a complete table is obtained. The hyphens which separate the EOs designate a concatenation. The intermediate template can be dispensed with, and the 2 consecutive segmentations can be replaced by their product, thus coming down to a single "Segmentation" EO as represented in the example of FIG. 6 at 200. In this figure, the connections between the complete Q/D space and the operand space have also been represented. The successive EOs are: "Projection" 210, where the "0" column makes it possible to "eliminate" the dimensions of the result patterns, "Shift" 211 which makes it possible to take account of the offset, that is to say of the fact that the operand patterns at the first iteration have an origin which is not placed on that of the table, and finally "Modulo" 212 in order to take account of the looping-back of the dimensions introduced by ARRAY-OL. This corresponds, for example, to the data originating from the signals of the sensors of a cylindrical antenna.

One application, in particular for signal Processing, is formed by consecutive tasks which can be composed into a single "macro-task", as represented in the task-composition example of FIG. 6. The successive tasks, FFT 601, CONV (convolution) 602 and IFFT (inverse FFT) 603 are brought together into a macro-task PCS ("Pulse Compression") 610. In this figure, the same conventions are repeated as in the patent application FR 99 02906, the squares $A_1, \ldots, A_4$ representing data tables and the circles representing tasks.

FIG. 7 corresponds to an example which defines the connections relating to an ARRAY-OL task "t" for example IFFT. Its expression in TDO form is given by:

$$(R_1) = \{|M| \cdot |S| \cdot |PRO| \cdot |G| \cdot \overline{SEG} \cdot |G|\}_t$$

The connections linking the results of this task t to the operands of the preceding task t-1, for example CONV, are expressed by:

$$(R_2) = \{|M| \cdot |S| \cdot |PRO| \cdot |G| \cdot \overline{SEG} \cdot |G|\}_{t-1}(R_1)$$

By putting ($R_2$) into the form of an expression of the same type as ($R_1$), the patterns, alignments and pavings of the macro-task resulting from the composition of tasks t and t-1 are defined. To that end, the EOs of ($R_2$) are modified while complying with a rule which intends it not to be possible to cut a connection defined by ($R_2$), but to be possible to add one if required.

The connections linking the results of the new task obtained t-1, t to the operands of the preceding task t-2, for example FFT, are expressed by:

$$(R_3) = \{|M| \cdot |S| \cdot |PRO| \cdot |G| \cdot \overline{SEG} \cdot |G| \cdot\}_{t-2} \{|M| \|S| \cdot |PRO| \cdot |G| \cdot \overline{SEG} \cdot |G|\}_{t-1,t}$$

By putting ($R_3$) in the form of an expression of the same type as ($R_1$), the TDO expression of the macro-task, for example CI, is obtained.

What is claimed is:

1. A method for automatic placing of the tasks of an application in a signal-processing machine comprising a first stage (101) in which, starting with data structured into tables visually displayed in the form of Cartesian identifiers (X, Y, Z, T), by implementing at least one transformation on these data (F), a set of elementary transforms is available in a library, for each transform, at input, at least one operand application table (30) is established, and, at the output, at least one result application table is established, an operand pattern (33) is established at the input to each elementary transform and a result pattern (34) is established at the exit, for each Cartesian-coordinate axis, at least two elements of the operand pattern and of the operand application table, on the one hand, of the result pattern and of the result application table on the other hand, are put into correspondence, and the refined relations characteristic of the accesses in the tables are used in signal processing in order to establish, by iteration, by the use of software included in the graphics tool, on the basis of at least two correspondences, all the accesses necessary for the complete execution of the transform in question, followed by a second stage (103) in which, starting from an input table which is sampled with an input pattern (901) according to an input-assemblage relationship and an input-paving relationship, each of these patterns is made to undergo an elementary transform ET which delivers output patterns (202), and an output table (201) is made up by assembling these output patterns according to an output-paving relationship and an output-aligning relationship, a first output multidimensional space is determined including a first set of axes (Q1, Q0) corresponding to the axes of the table which is the quotient of the output table and the output pattern, itself regarded as an output-divisor table, and a second set of axes (D1, D0) corresponding to the axes of this output-divisor table, this first space thus comprising all the outputs of the output table ranged in such a way as to be able to be traversed successively by one incrementation of the clock of the processor, and a first matrix for projection {MP} of this first space to the output table is determined, which makes it possible automatically to determine a first coding making it possible to place the outputs in the output table, characterized in that it is followed by a third stage (110) implementing a method using Table Distribution Operators (201), called TDOs, formed by a sequence of Elementary Operators (301), called EOs, which are separated by linking spaces (302), in order to describe the connections between the elements of a Sender space (202) $N^e$, and the elements of a Receiver space (203) $N^r$.

2. The method as claimed in claim 1, characterized in that it uses it uses 8 Elementary Operators EO, 4 of which are direct and 4 of which are the mirrors of the direct ones and which correspond to the following actions:

- a "Template" Elementary Operator, which serves to define the table sizes and the actions of which are "Cut" (204) and "Extend" (205);
- a "Modulo" Elementary Operator, which makes it possible to bring down the accesses within the tables and the action of which is "Make converge" (207);
- a "Shift" Elementary Operator, which makes it possible to take into account "pavings" not starting from the origin of the table and the action of which is "Extend" (205);
- a "Projection" Elementary Operator, which makes it possible to establish connections between an input space Nf and an output space Nt, and the actions of which are "Extend" and "Make converge";
- a "Template$^{-1}$" mirror Elementary Operator which makes it possible to extend or to cut, with identical parameter settings, the same connections as the "Template" Elementary Operator;
- an "Exploding" Elementary Operator, corresponding to the "Modulo$^{-1}$" mirror operator, which operates in the opposite way to the "Modulo" EO and the actions of which are "Cut" and "Multiply" (206);
- a "Shift$^{-1}$" Elementary Operator, which is the mirror of a direct Shift with opposite sign parameters;
- a "Segmentation" Elementary Operator, which is the mirror of the Projection operator and which makes it possible to segment a set of successive elements over the same dimension, and the actions of which are "Multiply" and "Cut".

* * * * *